United States Patent
Yoshinari et al.

[11] Patent Number: 6,096,399
[45] Date of Patent: Aug. 1, 2000

[54] OPTICAL RECORDING MEDIUM

[75] Inventors: Jiro Yoshinari; Masanori Kosuda; Hiroshi Shingai, all of Nagano, Japan

[73] Assignee: TDK Corporation, Tokyo, Japan

[21] Appl. No.: 09/217,578

[22] Filed: Dec. 21, 1998

[30] Foreign Application Priority Data

Dec. 22, 1997 [JP] Japan ..................................... 9-365706
Nov. 13, 1998 [JP] Japan ..................................... 10-341132

[51] Int. Cl.[7] ..................................................... B32B 3/00
[52] U.S. Cl. ........................ 428/64.1; 428/64.4; 428/64.5; 428/64.6; 428/913; 430/270.13; 430/495.1; 430/945; 369/283; 369/288
[58] Field of Search .................................. 428/64.1, 64.2, 428/64.4, 64.5, 64.6, 457, 913; 430/270.13, 495.1, 945; 369/283, 288

[56] References Cited

U.S. PATENT DOCUMENTS

| | | | |
|---|---|---|---|
| 5,863,702 | 1/1999 | Ohbayashi | 430/270.13 |
| 5,871,881 | 2/1999 | Nishida | 430/270.11 |
| 5,882,759 | 3/1999 | Hirotsune | 428/64.1 |
| 5,888,680 | 3/1999 | Ohbsyashi | 430/19 |
| 5,978,349 | 1/1999 | Yoshinari | 369/275.1 |

FOREIGN PATENT DOCUMENTS

| | | |
|---|---|---|
| 63-103453 | 5/1988 | Japan. |
| 1-112538 | 5/1989 | Japan. |
| 1-211249 | 8/1989 | Japan. |
| 1-245440 | 9/1989 | Japan. |
| 2-064937 | 3/1990 | Japan. |
| 4-052188 | 2/1992 | Japan. |
| 6-195747 | 7/1994 | Japan. |
| 8-127176 | 5/1996 | Japan. |

*Primary Examiner*—Elizabeth Evans
*Attorney, Agent, or Firm*—Oblon, Spivak, McClelland, Maier & Neustadt, P.C.

[57] ABSTRACT

A phase change type optical recording medium of Ge—Sb—Te system wherein number of overwritable operation has been increased is provided. The optical recording medium has a substrate and a recording layer of phase change type on the substrate, and the recording layer contains Ge, Sb and Te as its main elements, and at least one of Ag and Au in total content of 0.2 to less than 2.5 at % (excluding 2.5 at %).

13 Claims, 3 Drawing Sheets

OPTICAL RECORDING MEDIUM

BACKGROUND OF THE INVENTION

1. Field of the Invention

This invention relates to a phase change optical recording medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystalline state whereupon a change of reflectance by the crystallographic change is detected for reproduction of the information. The phase change optical recording media are of great interest since the optical system of the drive unit used for their operation is simple as compared with magneto-optical recording media.

Most optical recording media of phase change type used chalcogenide systems such as Ge—Sb—Te systems which provide a substantial difference in reflectance between crystalline and amorphous states and have a relatively stable amorphous state.

When information is recorded in the optical recording medium of phase change type, the laser beam applied is of high power (recording power) that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallizing temperature and lower than the melting temperature. The record mark to which the laser beam of erasing power is applied is heated to a temperature higher than the crystallizing temperature and then allowed to slowly cool to recover the crystalline state. Accordingly, in the optical recording media of the phase change type, the medium can be overwritten by modulating the intensity of a single light beam.

In the optical recording medium of phase change type, dielectric layers are generally formed on opposite sides of the recording layer. Requirements for the dielectric layers are:

(1) the dielectric layers should be capable of protecting the recording layer and the substrate from heat histerisis as a result of the laser beam irradiation;

(2) the dielectric layers should be capable of amplifying the reproduced signal by making use of optical interference effect of the lights reflected from boundaries between the layers; and (3) the recording and erasing properties can be regulated by adjusting thermal conductivity and the like of each dielectric layer.

Typical dielectric layers which meet such requirements are those containing highly refractive ZnS as their main component. For example, Japanese Patent Application Kokai (JP-A) No. 103453/1988 discloses an optical information recording material having a dielectric layer containing a mixture of ZnS and $SiO_2$. The merits described therein include increase in sensitivity for the power of incident light upon recording, and increase in the number of erasing/overwriting operations of the dielectric material. The increase in the sensitivity is said to have been realized by optimizing thermal constant of the dielectric layer, and the increase in the number of erasing/overwriting operations is said to have been realized by reducing the laser power required for the recording and the erasure. JP-A 103453/1988 discloses that $SiO_2/(ZnS+SiO_2)$ is preferably in the range of 10 to 30 mol % since the laser energy required for the recording and the erasure is minimum when $SiO_2/(ZnS+SiO_2)$ is in such range.

However, in the optical recording medium of phase change type having the recording layer comprising Ge—Sb—Te based material or the like, decrease in the erasability and increase in the jitter, and hence, decrease in C/N occurs with the repeated overwriting operations, and the medium becomes unoverwritable after approximately several thousand times. Major causes for such decrease in the C/N with the repeated overwriting operations include:

a) alteration in the thickness of the recording layer by the migration of the material constituting the recording layer in the direction of the recording track, b) alteration in the composition of the recording layer due to element diffusion between the recording layer and the adjacent dielectric layers, c) deformation or damage of the dielectric layer, and d) exfoliation at the interface between the recording layer and the dielectric layer, or the dielectric layer and the reflective layer.

Prevention of the deformation and the damage of the dielectric layer is suggested in, for example, in JP-A 64937/1990. JP-A 64937/1990 describes provision of a heat-resistant protective layer on one surface or both surfaces of the recording layer, and a protective layer having a bulk modulus smaller than that of the heat-resistant protective layer on at least one surface of the heat resistant protective layer, and the heat-resistant protective layer is thereby prevented from deformation and rupture and adaptability to repeated recording operations is improved. The exemplary materials disclosed therein for constituting the protective layer of smaller bulk modulus are $MoS_2$, ZnS, ZnSe and the like, and the exemplary materials disclosed therein for constituting the heat-resistant protective layer are silicon carbide, silicon nitride, and aluminum oxide. In Example 2 of JP-A 64937/1990, $SiN_x$ layers of 20 nm thick are formed on opposite sides of the recording layer, and a ZnS layer of 100 nm is formed on the $SiN_x$ layer on the side of the laser beam incidence and a ZnS layer of 200 nm is formed on the $SiN_x$ layer on the other side. There is described that the medium of such constitution exhibited good adaptability to repeated recording operations of several ten thousand times. It is believed that the element diffusion from the protective layer comprising ZnS to the recording layer is prevented in this example by the $SiN_x$ layer.

However, when the inventors of the present invention evaluated the medium of the layer constitution as described in the example of JP-A 64937/1990, the number of overwritable operations was only about 10,000.

Prevention of the migration and segregation of the recording layer is suggested, for example, in JP-A 127176/1996. JP-A 127176/1996 describes addition to phase change type recording film of Ge—Sb—Te system of at least one element X selected from the group consisting of Cr. Ag, Ba, Co, Ni, Pt, Si, Sr, Au, Cd, Cu, Li, Mo, Mn, Zn, Al, Fe, Pb, Na, Cs, Ga, Pd, Bi, Sn, Ti, V, In and lantanoid elements to promote precipitation of the high melting components having a melting point higher than that of the phase change components to thereby prevent the migration and segregation of the recording layer during the recording and the erasure. There is described that repeated overwriting operations in excess of $10^5$ times is enabled by such constitution.

In the examples of JP-A 127176/1996, Cr, Cu, Cr+Tl, Cr+N, or Cr+Se is used for the element X, and the element X is added in an amount of at least 3 at %, and initialization is conducted for several hundred times in order to promote the precipitation of the high melting metal phase for the purpose of preventing the migration and the segregation.

The initialization which should be conducted for several hundred times as described in JP-A 127176/1996 invites increase of the production cost, and is undesirable.

It should be noted that JP-A 127176/1996 discloses an example of Ag addition. Ag, however, is not added to the recording film, but to a mask layer provided for the purpose of super resolution reproduction.

SUMMARY OF THE INVENTION

An object of the present invention is to increase the number of overwritable operations of the optical recording medium of phase change type.

Such an object is realized by the optical recording medium of the constitution as described below in (1) to (13).

(1) An optical recording medium having a substrate and a recording layer of phase change type, wherein the recording layer contains Ge, Sb and Te as its main elements, and at least one of Ag and Au in total content of 0.2 to less than 2.5 at % (excluding 2.5 at %).

(2) An optical recording medium according to the above (1) wherein the recording layer has a first dielectric layer and a second dielectric layer disposed on lower and upper sides thereof and in contact therewith, respectively, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components, and the dielectric layer 1b contains silicon nitride and/or germanium nitride; silicon oxide; zinc sulfide and silicon oxide; or chromium oxide as its main component (s); and when the dielectric layer 1b contains zinc sulfide and silicon oxide as its main components, the dielectric layer 1b has silicon oxide content [$SiO_2/(ZnS+SiO_2)$] of at least 40 mol %, the silicon oxide content being determined by calculating the zinc sulfide and the silicon oxide in terms of ZnS and $SiO_2$, respectively; and the second dielectric layer contains zinc sulfide and silicon oxide; silicon oxide; oxide of a rare earth metal; or germanium nitride as its main component(s).

(3) An optical recording medium according to the above (1) wherein the recording layer has a first dielectric layer and a second dielectric layer disposed on lower and upper sides thereof and in contact therewith, respectively, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components, and the dielectric layer 1b contains silicon nitride and/or germanium nitride; silicon oxide; zinc sulfide and silicon oxide; or chromium oxide as its main component (s); and when the dielectric layer 1b contains zinc sulfide and silicon oxide as its main components, the dielectric layer 1b has silicon oxide content [$SiO_2/(ZnS+SiO_2)$] of at least 40 mol %, the silicon oxide content being determined by calculating the zinc sulfide and the silicon oxide in terms of ZnS and $SiO_2$, respectively; and the second dielectric layer comprises a dielectric layer 2a on the side of the recording layer and a dielectric layer 2b on the side of the reflective layer, and the dielectric layer 2a contains zinc sulfide and silicon oxide as its main components, and the dielectric layer 2b contains silicon oxide or oxide of a rare earth metal as its main component, or the dielectric layer 2a contains silicon nitride and/or germanium nitride; or chromium oxide as its main component(s), and the dielectric layer 2b contains a dielectric material having a thermal conductivity lower than the dielectric layer 2a as its main component.

(4) The optical recording medium according to the above (2) or (3) wherein the dielectric layer 1b has a thickness of 0.5 to 40 nm.

(5) The optical recording medium according to the above (3) wherein the dielectric layer 1b contains silicon nitride as its main component, and the dielectric layer 1b has a thickness of 0.5 to less than 5 nm (excluding 5 nm).

(6) The optical recording medium according to the above (2) or (3) wherein the dielectric layer 1a has silicon oxide content in the range of from 2 mol % to less than 40 mol % (excluding 40 mol %) when the silicon oxide content [$SiO_2/(ZnS+SiO_2)$] is determined by calculating the zinc sulfide and the silicon oxide in terms of ZnS and $SiO_2$, respectively.

(7) The optical recording medium according to the above (1) wherein the recording layer has a first dielectric layer and a second dielectric layer disposed on lower and upper sides thereof and in contact therewith, respectively, wherein said recording layer has a light absorption coefficient at recording/reproducing wavelength such that:

$$Ac/Aa \geq 0.9$$

when the light absorption coefficient of the medium in crystalline region of the recording layer is Ac and the light absorption coefficient in noncrystalline region is Aa;

the first dielectric layer comprises a dielectric layer 1a on the side of the substrate and a dielectric layer 1b on the side of the recording layer, and the dielectric layer 1b contains silicon nitride and/or germanium nitride as its main component(s), and the dielectric layer 1a contains zinc sulfide and silicon oxide as its main components; and at least the region of the second dielectric layer in contact with the recording layer contains germanium nitride and/or silicon nitride; oxide of a rare earth metal; silicon oxide; or zinc sulfide and silicon oxide as its main component(s); and when such region contains zinc sulfide and silicon oxide as its main components, the region has silicon oxide content [$SiO_2/(ZnS+SiO_2)$] of at least 40 mol %, the silicon oxide content being determined by calculating the zinc sulfide and the silicon oxide in terms of ZnS and $SiO_2$, respectively.

(8) The optical recording medium according to the above (7) wherein the dielectric layer 1b has a thickness of 0.5 to 40 nm.

(9) The optical recording medium according to the above (7) wherein the dielectric layer 1b contains silicon nitride as its main component, and the dielectric layer 1b has a thickness of 0.5 to less than 5 nm (excluding 5 nm).

(10) The optical recording medium according to the above (7) wherein the dielectric layer 1a has silicon oxide content in the range of from 2 mol % to less than 40 mol % (excluding 40 mol %) when the silicon oxide content [$SiO_2/(ZnS+SiO_2)$] is determined by calculating the zinc sulfide and the silicon oxide in terms of ZnS and $SiO_2$, respectively.

(11) The optical recording medium according to the above (7) wherein the recording medium has a reflective layer disposed on the second dielectric layer, and the reflective layer is the one comprising a metal and having a thickness of up to 40 nm, or the one comprising Si or Ge and having a thickness of up to 80 nm.

(12) The optical recording medium according to the above (11) wherein the recording medium has a third dielectric layer on the reflective layer.

(13) The optical recording medium according to anyone of the above (1), (2), (3) or (7) wherein the recording layer has an average crystal grain size of 20 to 150 nm.

DETAILED DESCRIPTION OF THE INVENTION

In the present invention, a predetermined amount of Ag and/or Au is added to the Ge—Sb—Te-based phase change type recording layer to increase number of overwritable operations, and the resulting optical recording medium exhibits the C/N ratio of sufficient level after repeating normal overwriting operations for over 100,000 times. The "normal overwriting operations" used herein designates relatively random overwriting operations which are conducted under normal conditions using an optical recording medium evaluator such that the record marks are not necessarily overlaid completely on the previous record marks. It has also been confirmed in the present invention that the optical recording medium endures overwriting operations of more than 100 times in the evaluation test under severer conditions which simulates the overwriting operations in the actual optical disc drive, namely, in the test wherein the overwriting is conducted such that the record marks of the same signal are completely overlaid on the previous record marks. Furthermore, in the present invention, the initialization is completed by one operation as in the case of ordinary phase change type optical recording media in contrast to the optical recording medium of JP-A 127176/1996 wherein initialization operations of several hundred times were necessary.

Next, the functions and merits of the first dielectric layer and the second dielectric layer respectively provided on the lower and upper sides of the recording layer are described by referring to the preferred embodiments. The optical recording medium of the present invention is generally applicable to the optical recording medium of reflective type or the optical recording medium of absorption coefficient control type as will be described later.

Figure 1:
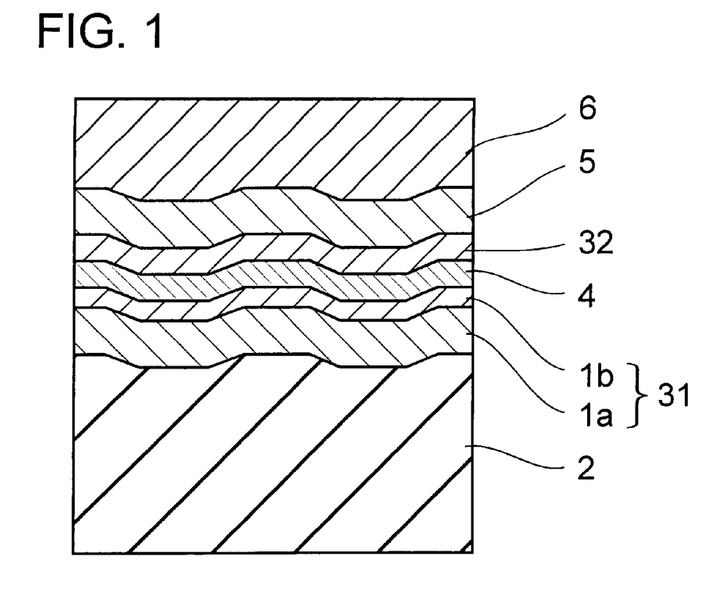
FIG. 1 is a partial cross-sectional view of an embodiment of the optical recording medium (of reflective type) according to the present invention.

FIG. 1 shows an exemplary preferred embodiment of the optical recording medium of reflective type. This optical recording medium comprises a substrate 2, and a first dielectric layer 31, a recording layer 4 of phase change type, a second dielectric layer 32, and a reflective layer 5 comprising a metal disposed on the substrate 2 in this order, and the first dielectric layer 31 comprises a dielectric layer 1a on the side of the substrate 2 and a dielectric layer 1b on the side of the recording layer 4.

The dielectric layer 1a contains a mixture of zinc sulfide and silicon oxide as its main component. The dielectric layer 1b contains either a dielectric material other than such mixture, or such mixture wherein the zinc sulfide content is relatively lower than such mixture as its main component(s). Increase in jitter by repeated overwriting operations can be suppressed by such constitution, and the number of overwritable operations is sufficiently increased. The reason for such increase in the number of overwritable operations is not certain. However, it is estimated that the provision of the dielectric layer 1b between the dielectric layer 1a and the recording layer 4 prevents alteration of the composition of the recording layer 4 by the diffusion of Zn and S from the dielectric layer 1a.

In the medium of the structure shown in FIG. 1, the second dielectric layer 32 is in the path of heat dissipation from the recording layer 4. Since the heat passing through the second dielectric layer 32 is quickly dissipated from the reflective layer 5, temperature elevation of the second dielectric layer 32 is smaller than that of the first dielectric layer 31. Accordingly, the second dielectric layer 32 exhibits smaller diffusion of zinc and sulfur compared to the first dielectric layer 31, and instead, the second dielectric layer 32 is required to have higher resistance to exfoliation at their boundaries with the reflective layer 5 and the recording layer 4 as well as improved heat conduction. In view of such situation, in the preferred embodiments of the present invention, the second dielectric layer 32 contains a mixture of zinc sulfide and silicon oxide as its main components. When the main component of the second dielectric layer 32 comprises such mixture of zinc sulfide and silicon oxide, the second dielectric layer 32 enjoys high resistance to exfoliation owing to the low bulk modulus of such mixture. The mixture of zinc sulfide and silicon oxide also has a low heat conduction, and the second dielectric layer 32 may have a reduced thickness. However, when the recording should be accomplished at a high power, the temperature of the second dielectric layer 32 is inevitably elevated, and zinc and sulfur diffusion from the second dielectric layer 32 to the recording layer 4 is likely to occur. In view of such situation, silicon oxide, oxide of a rare earth metal, or germanium nitride may be used in such embodiment as the main component of the second dielectric layer 32 to thereby avoid the zinc and sulfur diffusion from the second dielectric layer 32 to the recording layer 4.

Figure 2:
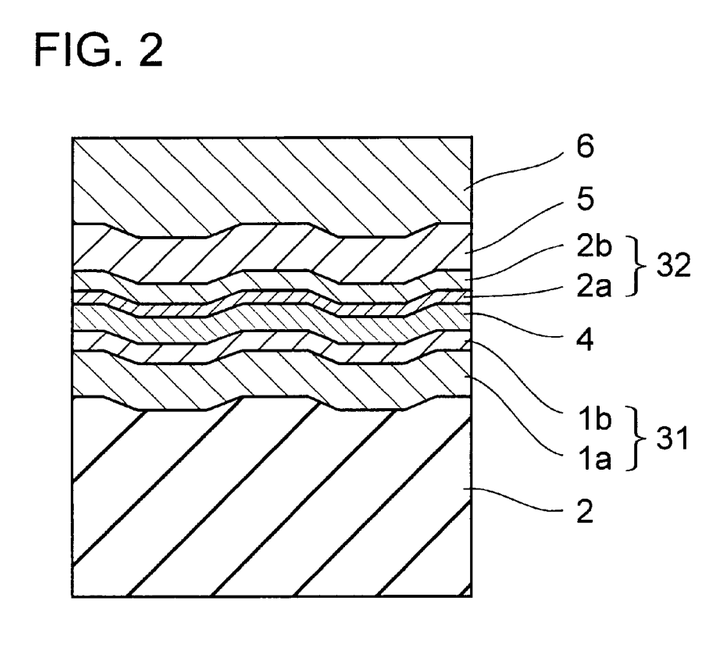
FIG. 2 is a partial cross-sectional view of another embodiment of the optical recording medium (of reflective type) according to the present invention.

However, when the layer of silicon oxide or oxide of a rare earth metal is formed in contact with the recording layer, the recording layer will exhibit a higher crystallization speed. Therefore, when there is a need for reducing the crystallization speed, a second dielectric layer of dual layer structure may be employed as shown in FIG. 2, and in such case, a dielectric layer 2a comprising a mixture of zinc sulfide and silicon oxide may be formed between the dielectric layer 2b of silicon oxide or oxide of a rare earth metal and the recording layer 4. The crystallization speed of the recording layer is suppressed by such constitution. It should be also noted that the dielectric layer 2a in such constitution will fully play its role even if the layer was quite thin, and therefore, provision of such dielectric layer 2a has no adverse effects (such as zinc and sulfur diffusion) on the recording layer. Increase in the crystallization speed of the recording layer resulting from the composition selected for the adjacent dielectric layer can also be reduced by controlling the amount of silver and/or gold added to the recording layer since the crystallization speed of the recording layer decreases by the addition of the silver and/or gold to the recording layer as will be described later.

The constitution wherein the dielectric layer 2a of the structure shown in FIG. 2 contains silicon nitride and/or germanium nitride, or chromium oxide as its main component(a) is also within the scope of the present invention. In this case, the dielectric layer 2b contains a dielectric material having a thermal conductivity lower than the dielectric layer 2a as its main component. Silicon nitride, germanium nitride, and chromium oxide, and in particular, silicon nitride and chromium oxide are the compounds of high thermal conductivity. When a dielectric layer comprising such compound is disposed in contact with the recording layer, heat diffusion in in-plane direction will be facilitated, and improvement in record mark detection sensitivity by enlarging the record marks is enabled. However, when the entire dielectric layer is constituted from such compound, excessive heat dissipation from the recording layer to the reflective layer through the dielectric layer will take place. The heat dissipation to the reflective layer can be suppressed by extensively increasing the thickness of the dielectric layer. Such increase, however, results in the difficulty of optical design of the whole medium. In view of such situation, when the above-mentioned compounds are used for the second dielectric layer, the second dielectric layer 32 of bi-layer structure is adopted as shown in FIG. 2, and the dielectric layer 2a in contact with the recording layer 4 contains the above-mentioned compound with high thermal conductivity as its main component and the dielectric layer 2b on the side of the reflective layer 5 contains a compound having a thermal conductivity lower than the dielectric layer 2a as its main component.

Figure 3:
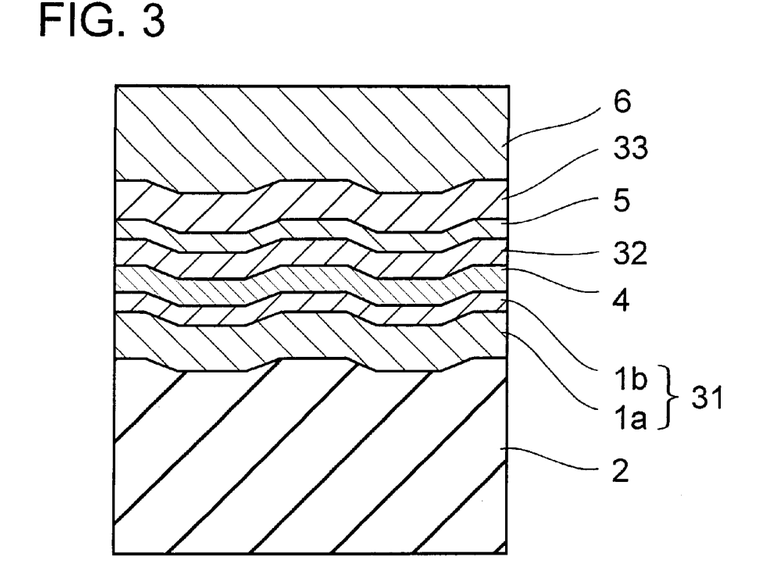
FIG. 3 is a partial cross-sectional view of an embodiment of the optical recording medium (of absorption coefficient control type) according to the present invention.
Figure 4:
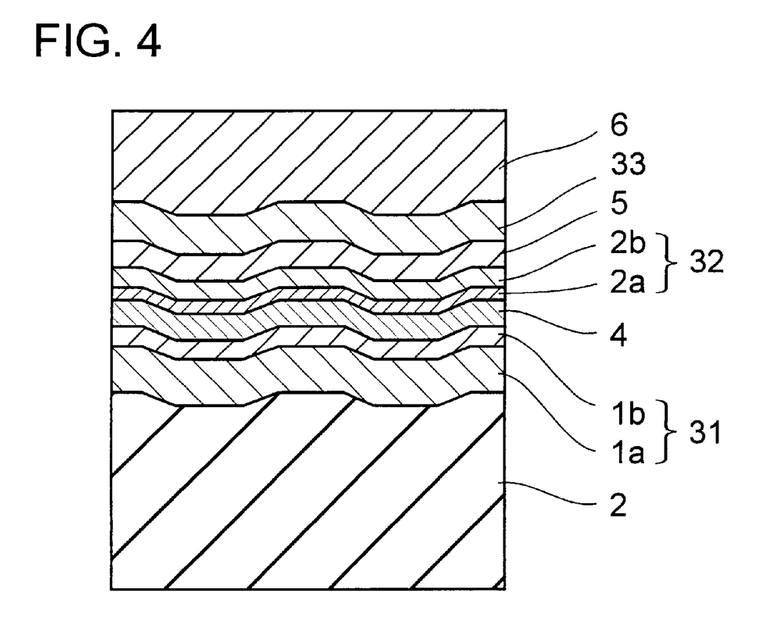
FIG. 4 is a partial cross-sectional view of another embodiment of the optical recording medium (of absorption coefficient control type) according to the present invention.

FIGS. 3 and 4 show exemplary preferred embodiments of the optical recording medium of absorption coefficient control structure. The first dielectric layer 31 in the optical recording medium of this constitution is the same as the first dielectric layer 31 shown in FIG. 1, and the diffusion of zinc and sulfur which adversely affects the recording layer 4 is suppressed as in the case of the embodiment of FIG. 1. In addition, the second dielectric layer 32 in FIG. 3 and the dielectric layer 2a in FIG. 4 contains germanium nitride and/or silicon nitride; oxide of a rare earth metal; silicon oxide; or ZnS—SiO$_2$ (with high content of the silicon oxide) as its main component(s), and the diffusion of zinc and sulfur from the second dielectric layer 32 to the recording layer 4 is considerably or fully suppressed.

When the recording medium was prepared in accordance with the example of JP-A 64937/1990, supra, by forming SiN$_x$ layers on opposite sides of the recording layer and evaluated, the number of overwritable operations remained around ten thousand times, which is inferior to the results of the present invention. Although the reason is unclear, it is estimated that the large stress that occurs in the SiN$_x$ layers on opposite sides of the recording layer results in inferior mechanical properties of the boundary between the SiN$_x$ layers and the adjacent layers, inviting exfoliation. In the study of the inventors of the present invention, it has been found that the SiN$_x$ layer between the substrate and the recording layer undergoes exfoliation during high temperature, high humidity storage when the SiN$_x$ layer is too thick.

JP-A 195747/1994 discloses an optical disc wherein a ZnS—SiO$_2$ layer, an Si$_3$N$_4$ layer, a recording layer, a ZnS—SiO$_2$ layer, and a reflective layer are formed on the substrate in this order. This optical disc shares a common feature with the preferred embodiment of the optical recording medium of the present invention that an Si$_3$N$_4$ layer is formed between the recording layer and the ZnS—SiO$_2$ layer on the side of the substrate.

JP-A 195747/1994, however, is silent about the addition of Ag and/or Au in the recording layer. In addition, the object of the invention described in JP-A 195747/1994 is prevention of decrease in the erasability when used with a short wavelength light source or under high speed disc rotation, and this object is different from the object of the present invention. In JP-A 195747/1994, the Si$_3$N$_4$ layer is provided for the purpose of realizing such object and the Si$_3$N$_4$ layer is used as a layer for promoting the crystallization of the recording layer. In the investigation by the inventors of the present invention, the preferable thickness of the Si$_3$N$_4$ layer used for the purpose of promoting the crystallization of the recording layer is thicker than the thickness of the dielectric layer 1b defined in the preferred embodiment of the present invention. Therefore, when the Si$_3$N$_4$ layer is formed to a thickness capable of attaining the object described in JP-A 195747/1994, the merit of the present invention, namely, increase in the number of overwritable operations will be insufficient. When the Si$_3$N$_4$ layer corresponding to the dielectric layer 1b of the present invention is too thick, the ZnS—SiO$_2$ layer between the Si$_3$N$_4$ layer and the substrate will be relatively thin, and it will be difficult to attain the high C/N. When the Si$_3$N$_4$ layer corresponding to the dielectric layer 1b of the present invention is too thick, exfoliation between the layers will also take place during the storage in high temperature, high humidity environment. It should be noted that JP-A 195747/1994 is utterly silent about the thickness of the Si$_3$N$_4$ layer, or use of germanium nitride instead of the Si$_3$N$_4$.

JP-A 52188/1992 discloses an optical recording medium of phase change type wherein a transparent substrate, a first protective layer, a recording thin film, a second protective layer, and a reflective layer are formed in this order. This medium shares common features with the preferred embodiment of the optical recording medium of the present invention that the recording thin film comprises Te—Ge—Sb, a nitride layer comprising GeN is formed on at least one side of the recording thin film, and the first and the second protective layers comprise ZnS—SiO$_2$.

JP-A 52188/1992, however, is silent about the addition of Ag and/or Au in the recording layer. In addition, the object of the invention described in JP-A 52188/1992 is to melt the nitride layer for its mixing with the recording thin film to thereby supply nitrogen to the recording thin film during the initialization carried out for crystallization of the entire surface of the recording thin film. Nitrogen is supplied to the recording thin film to thereby prevent movement of the material constituting the recording thin film along the guide groove of the substrate by the pulsatic movement of the protective layer associated with the repeated recording and erasure. Accordingly, when the medium described in JP-A 52188/1992 is recorded and erased after the initialization, the nitride layer is either absent, or if present, has undergone a drastic change in its composition, and such layer is no longer capable of achieving the function equivalent to the dielectric layer 1b of the present invention, namely, the function as a barrier layer for the diffusion of zinc and sulfur. The recording thin film that has been initialized by melting comprises coarse crystal grains having diameters in excess of 150 nm, and the grain size gradually decreases with the repeated recording and erasure. In other words, the repeated recording and erasure invite atom movement, and hence, segregation within the recording thin film to detract from stable performance. In contrast, in the present invention, the recording layer is crystallized in solid phase in the initialization, and therefore, the dielectric layer 1b does not loose the function as the barrier layer. The average crystal grain size after the solid phase initialization is approximately 20 to 150 nm, which is close to the crystal grain size after repeated recording and erasure, and this enables stable recording and erasure. In addition, the optical recording medium actually produced in the example of JP-A 52188/1992 is different from that of the preferred embodiment of the present invention in that the nitride layer is formed between the recording thin film and the second protective layer and not between the recording thin film and the first protective layer, and therefore, the merit of the present invention will not be realized even if the nitride layer remained after the initialization by melting.

Addition of the Ag or Au to the phase change type recording layer of Ge—Sb—Te system is already known and such addition is described, for example, in JP-A 127176/1996 as described above.

JP-A 127176/1996, however, is impractical as mentioned above since initialization operations of several hundred times are required. In addition, JP-A 127176/1996 only discloses the examples wherein Cr is added. When the inventors of the present invention prepared an optical recording medium having the recording layer of Ge—Sb—Te system wherein 3 at % of Cr is added in accordance with the description of JP-A 127176/1996 and conducted the initialization operation only for once, overwriting of the medium was impossible because of the excessively low crystallization speed. The medium wherein the Cr content was reduced to less than 2.5% (note that the total content of Ag and Au is limited to below 2.5% in the present invention) was also impossible to overwrite when the initialization operation was conducted only once due to the excessively low crystallization speed.

In addition to JP-A 127176/1996, JP-A 112538/1989 also discloses an optical information recording medium having the recording layer comprising GeTe—Ag$_2$Te—Sb$_2$Te$_3$ pseudo-ternary alloy. The merits of such medium described in JP-A 112538/1989 are high crystallization temperature, high crystallization speed, and capability of providing an optical disc with high recording sensitivity. In the example of JP-A 112538/1989, heat resistant protective layers comprising ZnS are disposed on both sides of the recording layer.

JP-A 112538/1989, however, is silent about the influence on the overwriting, and the constitution of the dielectric layers as adopted in the preferred embodiment of the present invention is not disclosed in JP-A 112538/1989. On the other hand, JP-A 112538/1989 describes that high crystallization temperature, high crystallization speed, and high recording sensitivity are simultaneously satisfied when the silver content in the recording layer is 2.5 at % or higher. However, in the experiment carried out by the inventors of the present invention, crystallization speed, and hence, erasability decreased with the increase in the silver content. As a matter of fact, FIG. 5 of JP-A 112538/1989 also shows the need for the use of a laser power as high as 10 mW and a laser irradiation period as long as over 0.1 μsec. to accomplish sufficient crystallization (erasure) at the silver content of 2.5 at %. In contrast, the silver content of the present invention is lower than the range of JP-A 112538/1989, and such lower content has been selected to enable use of the resulting medium at a high transfer rate.

JP-A 211249/1989 describes an optical recording medium having an optical recording film represented by the general formula:

$[(Te_xSb_{1-x})_{1-y}Ge_y]_{1-z}M_z$ wherein M is at least one member selected from Au, Pd, Ni, Pt, Cu, Ag, Co, Pb and Bi, and 0.3 ≦ x ≦ 0.9,

0 < y ≦ 0.2, and

0 < z ≦ 0.2.

In other words, JP-A 211249/1989 describes addition of Au and/or Ag in the Ge—Sb—Te based recording layer. The merits described in JP-A 211249/1989 are higher crystallization speed of the recording film which enables recording of the information at a higher rate and a higher density; higher recording and erasing sensitivity; and higher stability at non-crystalline state.

However, the elements actually used in the examples of JP-A 211249/1989 are only Au and Pd and no example uses Ag, and the element M is added in the examples at an amount of 10 at % or higher. In spite of the description of higher crystallization speed as its merit in JP-A 211249/1989, in the in the experiment carried out by the inventors of the present invention, addition of Au in an amount of 10 at % or more resulted in the excessively low crystallization speed which rendered the overwriting impossible. In addition, there is no description of providing a dielectric layer in contact with the recording film.

JP-A 245440/1989 describes an information recording thin film represented by the general formula:

$Ge_xTe_ySb_zA_aB_b$ wherein Z, Y, Z, a and b in at % are

0 ≦ X ≦ 18,

45 ≦ Y ≦ 70,

11 ≦ Z ≦ 54,

0 ≦ a ≦ 20,

0 ≦ b ≦ 20, and

1 ≦ a+b ≦ 20, respectively; and

A is at least one member selected from Tl, halogen elements and alkaline metal elements; and B is at least one member selected from Co, Fe, Ni, Sc, Ti V, Cr, Mn, Cu, Zn, Y, Zr, Nb, Mo, Ru, Rh, Pd, Ag, Cd, Hf, Ta, W, Re, Os, Ir, Pt, and Au. In other words, JP-A 245440/1989 describes addition of Au and/or Ag in the Ge—Sb—Te based recording layer. The merits described in JP-A 245440/1989 are provision of an information recording material which can be produced in a simple production process, which exhibits good repeatability, excellent recording/reproducing properties and long term stability, and which allows the recorded information to be overwritten for many times (more than 3×10$^5$ times in the example).

However, the elements actually used in the examples of JP-A 245440/1989 are only Tl and Co and no example uses Ag or Au. In addition, the criteria used in the evaluation is not specified in JP-A 245440/1989 while it should be noted that, in the present invention, addition of Ag and/or Au realizes sufficient durability to withstand overwriting operations even when the record marks are completely overlaid on the previous record marks. Furthermore, ZnS layers are disposed on opposite sides of the information recording thin film in JP-A 245440/1989, and such structure is also different from the preferred embodiments of the present invention.

PREFERRED EMBODIMENTS OF THE INVENTION

Next, the present invention is described in further detail by referring to the preferred embodiments of the invention.

Constitution of FIGS. 1 and 2 (reflective structure)

Exemplary preferred embodiments of the optical recording medium of the present invention are shown in FIGS. 1 and 2. These optical recording media are single side (single substrate) optical recording media which comprise a first dielectric layer 31, a recording layer 4, a second dielectric layer 32, a reflective layer 5, and a protective layer 6 on a substrate 2 formed in this order. The present invention is also applicable for a double side recording medium comprising two single side recording media which are adhered to each other by an intervening adhesive layer such that the protective layer 6 is located in the interior side of the resulting medium. The present invention is also applicable for a medium comprising the single side recording medium as described above adhered to a protective substrate by an intervening adhesive layer.

The reflective layer 5 of the optical recording media shown in FIGS. 1 and 2 is a relatively thick metal layer, and this reflective layer is different from the medium of the absorption coefficient control structure as described below. In the present invention, such medium is referred to as the medium of reflective structure. It should be noted that the medium of reflective structure is the medium having a Ac/Aa as defined below of less than 0.9.

Substrate

In the optical recording medium of the present invention, the recording layer 4 is irradiated with the light beam through the substrate 2, and therefore, the substrate 2 is preferably formed of a material substantially transparent to the light beam employed, for example, a resin or a glass. Typical such resins include acrylic resins, polycarbonate, epoxy resins and polyolefins. The shape and dimensions of the substrate are not critical although it is generally of disc shape having a thickness of about 0.5 to 3 mm and a diameter of about 50 to 360 mm. The substrate may be provided on its surface with a predetermined pattern of grooves for tracking and addressing purposes.

The optical recording medium of the present invention is adapted for use in high density recording, and in particular, for the system wherein both the land and the groove are used for the recording tracks (land/groove recording). In such a case, typical recording track pitch is preferably in the range of about 0.3 to 1.0 μm.

First Dielectric Layer 31 and Second Dielectric Layer 32

The first dielectric layer 31 plays the role of preventing oxidation of the recording layer and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The constitution of the first dielectric layer 31 is not particularly limited. The first dielectric layer 31, however, may preferably have a dual layer structure as shown in the drawings in order to increase the number of overwritable operations.

The first dielectric layer 31 shown in FIGS. 1 and 2 comprises a dielectric layer 1a on the side of the substrate 2 and a dielectric layer 1b on the side of the recording layer 4. The dielectric layer 1a contains zinc sulfide and silicon oxide as its main components. The silicon oxide content of the dielectric layer 1a is in the range of 2 mol % to less than 40 mol % (not including 40 mol %), and preferably, 10 to 30 mol %. When the silicon oxide content of the dielectric layer 1a is too high, refractive index will be too small to realize high C/N ratio. When the silicon oxide content is too low, the number of overwritable operations will be reduced. The dielectric layer 1a may be either of homogeneous composition or of composition gradient structure in which the silicon oxide content varies incrementally or continuously.

The dielectric layer 1b may contain silicon nitride and/or germanium nitride; silicon oxide; zinc sulfide and silicon oxide; or chromium oxide as its main component(s), and preferably, the dielectric layer 1b comprises silicon nitride and/or germanium nitride; or chromium oxide as its main component(s), and more preferably, the dielectric layer 1b comprises silicon nitride, germanium nitride, or chromium oxide as its main component, and most preferably, the dielectric layer 1b comprises germanium nitride or chromium oxide as its main component. The composition of the silicon nitride is not particularly limited, and exemplary composition is $Si_xN_{1-x}$ (wherein x is in the range of 0.35 to 0.55). The composition of the germanium nitride is also not particularly limited, and exemplary composition is $Ge_xN_{1-x}$ (wherein x is in the range of 0.35 to 0.55). The composition of the chromium oxide is also not particularly limited, and exemplary composition is $Cr_xO_{1-x}$ (wherein x is in the range of 0.30 to 0.50). On the other hand, when the dielectric layer 1b comprises zinc sulfide and silicon oxide as its main components, the content of the silicon oxide is at least 40% by mole, and preferably at least 45% by mole. When the content of the silicon oxide in the dielectric layer 1b is too low, the diffusion of zinc and sulfur is not sufficiently suppressed, and number of overwritable operations is reduced.

The second dielectric layer 32 may be either of single layer structure (see FIG. 1) or of laminate structure (see FIG. 2) as described above. When the second dielectric layer 32 has single layer structure, the second dielectric layer may preferably contains zinc sulfide and silicon oxide; silicon oxide; oxide of a rare earth metal; or germanium nitride as its main component(s). When the second dielectric layer 32 is has laminate structure, the second dielectric layer is preferably constituted from two dielectric layers 2a and 2b, namely, the dielectric layer 2a comprising zinc sulfide and silicon oxide as its main components and the dielectric layer 2b comprising silicon oxide or oxide of a rare earth metal as its main component; or the dielectric layer 2a comprising silicon nitride and/or germanium nitride, or chromium oxide as its main component(s) and the dielectric layer 2b comprising a dielectric material having a thermal conductivity lower than the dielectric layer 2a. An exemplary preferable dielectric material having a low thermal conductivity is a mixture of zinc sulfide and silicon oxide, and the content of the silicon oxide in such mixture is preferably 2 mol % or higher, and more preferably 2 to 60 mol %.

When the second dielectric layer 32 is of single layer structure containing zinc sulfide and silicon oxide as its main components, the silicon oxide content is preferably at least 2 mol %, and more preferably at least at least 40 mol %. When the silicon oxide content of the second dielectric layer 32 is too low, influence of the zinc and sulfur diffusion from the second dielectric layer 32 to the recording layer 4 will be significant.

When the second dielectric layer 32 is of dual layer structure and a dielectric layer 2a containing zinc sulfide and silicon oxide as its main components is provided, the dielectric layer 2a may preferably have a silicon oxide content of 5 to 60 mol %. When the silicon oxide content of the dielectric layer 2a is too low, influence of the zinc and sulfur diffusion will be significant. When the silicon oxide content of the dielectric layer 2a is too high, merit of providing the dielectric layer 2a will not be sufficiently realized.

The rare earth metal element which may be employed in the second dielectric layer 32 is not limited to any particular type, and at least one rare earth metal element selected from Ce, La, Y, Pr, Nd, Pm, Sm, Eu, Gd, Tb, Dy, Ho, Er, Tm, Yb, Lu and the like may be employed. The rare earth metal element is preferably at least one of Ce, La and Y.

It should be noted that the above-described silicon oxide content which should be fulfilled by each of the dielectric layers should be fulfilled not only as the average of each layer, and every part of the layer should be within such range.

The content of the silicon oxide used in the present invention is the value determined by $SiO_2/(ZnS+SiO_2)$ when the zinc sulfide and the silicon oxide are calculated in terms of ZnS and $SiO_2$, respectively, that is, after determining the amount of sulfur, zinc and silicon by fluorescent X-ray analysis. It should be noted that, when excessive zinc is present in relation to sulfur, or excessive sulfur is present in relation to zinc, the excessive zinc or sulfur is assumed to be present in the form of other compounds (such as ZnO or the like) or in free form, and the smaller one of the zinc content and the sulfur content is used in the determination of the ZnS content.

The first dielectric layer 31 is preferably 30 to 300 nm thick, and more preferably, 50 to 250 nm thick. When the first dielectric layer has such thickness, the damage to the substrate upon recording can be effectively prevented and higher degree of modulation is available.

The dielectric layer 1b may preferably have a thickness of 0.5 to 40 nm, and more preferably, 0.8 to 30 nm. However, it should be noted that the thickness of the dielectric layer 1b is preferably limited to less than 5 nm, and in particular, to 4 nm or less when the dielectric layer 1b is formed from silicon nitride in order to prevent the exfoliation under high temperature, high humidity conditions. On the other hand, when the dielectric layer 1b is formed from germanium nitride or $ZnS$—$SiO_2$, the layer is preferably deposited to a thickness of 5 to 40 nm, and more preferably to 5 to 30 nm for the purpose of improving the barrier properties since the layer comprising germanium nitride or $ZnS$—$SiO_2$ is resistant to exfoliation under high temperature, high humidity conditions. When the dielectric layer 1b is formed from chromium oxide, the layer is preferably deposited to a thickness of up to 10 nm. Improvement in the number of overwritable operations will be insufficient when the dielectric layer 1b is excessively thin or thick.

The ratio $(t_{1b}/t_1)$ of the thickness of the dielectric layer 1b $(t_{1b})$ to the thickness of the first dielectric layer $(t_1)$ is preferably up to 0.5, and more preferably, up to 0.4. Even if the thickness of the dielectric layer 1b were within the above-specified preferable range, the number of overwritable operations will not be sufficiently improved when the ratio $t_{1b}/t_1$ is too large.

The second dielectric layer 32 is preferably 10 to 50 rim thick, and more preferably, about 13 to 35 nm thick. This thickness range ensures a fast cooling rate and thus permits to define a record mark with a clear edge, resulting in reduced jitter. Also higher degree of modulation is available.

When the second dielectric layer 32 comprises two layers, the dielectric layer 2a may preferably have a thickness of 2 to 15 nm, and more preferably, 3 to 10 nm. When the dielectric layer 2a is too thin, the merit of providing the dielectric layer 2a is not sufficiently realized. On the other hand, when the dielectric layer 2a is too thick, influence of the zinc and sulfur dispersion of from the dielectric layer 2a to the recording layer 4 will be increased in the recording at a high power. It should be noted that the ratio $(t_{2b}/t_2)$ of the thickness of the dielectric layer 2b $(t_{2b})$ to the thickness of the second dielectric layer $(t_2)$ is preferably up to about 0.5.

The dielectric layer containing zinc sulfide may preferably contain an element whose standard free energy of sulfide formation is lower than the standard free energy of ZnS formation at 0 to 1000° C. (hereinafter referred to as metal element A). Incorporation of the metal element A in the dielectric layer results in the suppressed release of sulfur and zinc upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300K, the standard free energy of ZnS formation is about –230 kJ/mol, the standard free energy of CeS formation is about –540 kJ/mol, the standard free energy of CaS formation is about –510 kJ/mol, the standard free energy of MgS formation is about –390 kJ/mol, the standard free energy of SrS formation is about –500 kJ/mol, the standard free energy of BaS formation is about –460 kJ/mol, and the standard free energy of $Na_2S$ formation is about –400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semimetal such as silicon is included in the "total metal elements" in the dielectric layer.

The metal element A in the dielectric layer may take form of simple substance, sulfide, oxide, fluoride, or the like.

The dielectric layers are preferably formed by vapor deposition such as sputtering and evaporation, and in particular, by sputtering. The dielectric layer 1b may be formed, for example, by the sputtering wherein silicon nitride and/or germanium nitride is used for the target, or by the reactive sputtering wherein the sputtering is effected in a nitrogen-containing argon atmosphere by using a target comprising Ge and/or Si.

When the dielectric layer of composition gradient structure is formed by sputtering, the dielectric layer may be formed, for example, by multi-target sputtering utilizing two or more targets and the ratio of the power applied to each target may be incrementally or continuously altered from the initial stage to the terminal stage of the film deposition.

The metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as ZnS—$SiO_2$, or alternatively, ZnS and $SiO_2$ may be separately used for the main targets in multi-target sputtering.

When Ag and/or Au is added to the recording layer, crystallization speed is reduced, and erasure becomes difficult compared to the case when no Ag and/or Au is added to the recording layer. In order to prevent such decrease in the crystallization speed with no alteration in the thermal design of the medium, introduction in the second dielectric layer of nitrogen and/or oxygen is preferable. Although introduction of the nitrogen and/or oxygen in the vicinity of the boundary between the second dielectric layer and the recording layer is sufficient, the nitrogen and/or oxygen may be introduced in the entire second dielectric layer. Use of nitrogen is more preferable in view of the smaller adverse effect associated with the introduction.

The nitrogen and/or oxygen may be introduced in the second dielectric layer by any procedure including the procedure wherein $N_2$ and/or $O_2$ is introduced in the sputtering atmosphere before or simultaneously with the formation of the second dielectric layer by sputtering and terminating the introduction of the $N_2$ and/or $O_2$ immediately after the start of the formation of the second dielectric layer; the procedure wherein $N_2$ and/or $O_2$ is introduced in the sputtering atmosphere before or simultaneously with the formation of the second dielectric layer and reducing the concentration of the $N_2$ and/or $O_2$ immediately after the start of the formation of the second dielectric layer; and the procedure wherein $N_2$ and/or $O_2$ is introduced in the sputtering atmosphere before or simultaneously with the formation of the second dielectric layer and continuing the introduction of the $N_2$ and/or $O_2$ during the formation of the second dielectric layer. Alternatively, introduction may be conducted by the procedure wherein $N_2$ and/or $O_2$ is introduced in the sputtering atmosphere during the formation of the recording layer by sputtering and increasing the concentration of the $N_2$ and/or $O_2$ immediately before the termination of the formation of the recording layer; or by the procedure wherein discharge treatment is conducted after the formation of the recording layer in the atmosphere containing $N_2$ and/or $O_2$ followed by the formation of the second dielectric layer. It is also possible to combine two or more such procedures.

The gas used in the introduction of the $N_2$ and/or $O_2$ to the second dielectric layer (hereinafter referred to as introduction gas) is not limited to any particular gas, and an oxidative gas other than $O_2$, such as the gas represented by $NO_x$, for example, $NO_2$ can also be used.

In the formation of the second dielectric layer by sputtering, a gas mixture is preferably introduced such that the flow rate ratio [the gas introduced/(Ar+the gas introduced)] is in the range of 5 to 40%.

When the metal element A as described above is incorporated in the dielectric layer, the sputtering is preferably effected in a mixed atmosphere of argon and oxygen. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of flow rate ratio between the inert gas such as argon and the oxygen $[O_2/(Ar+O_2)]$ is preferably 5 to 40%. Excessive introduction of the oxygen is undesirable since the recording power decreases with no difference in the erasing power, and the erasing power margin will be extremely narrow.

Recording Layer 4

In the present invention, Ag and/or Au, and preferably Ag or Au is added to the recording layer of Ge—Sb—Te based system. Content of the Ag+Au is in the range of 0.2 to less than 2.5 at % (excluding 2.5 at %), and preferably in the range of 0.5 to 2.0 at %. The preferable content is the same when Ag is added alone. However, when Au is added alone, the preferable content is in the range of 0.2 to 1.0 at %. Addition of the Ag and/or Au in an excessively low amount is insufficient in suppressing the segregation of the recording layer. On the other hand, addition of the Ag and/or Au in an excessive amount will invite excessively reduced crystallization speed and incapability of the overwriting.

When the composition (in atomic ratio) of the recording layer is represented by the formula (I):

$(Ge_aSb_bTe_{1-a-b})_{1-c}M_c$     (I)

a, b, and c are preferably in the range of:

0.08≦a≦0.25

0.20≦b≦0.40, and 0.002≦c≦0.025.

It should be noted that M represents at least one of Ag and Au.

If the value of a is too small in the formula (I), record marks are more unlikely to crystallize and erasability will be reduced. If the value of a is too large, a large amount of tellurium will bond to germanium to invite precipitation of antimony and formation of the record marks will be inhibited.

If the value of b is too small, the content of tellurium will be too much and the record marks are more likely to crystallize when the medium is stored at elevated temperature with a loss of reliability. If the value of b is too large, antimony will precipitate to inhibit formation of the record marks.

The value of c in the formula (I), namely, the content of Ag+Au is limited to the range as specified above for the reason as described above.

The composition of the recording layer is identifiable by electron probe microanalysis (EPMA), X-ray microanalysis, ICP etc.

The recording layer of this composition system preferably has a thickness of about 14 to 50 nm. A too thin recording layer would restrain the growth of a crystalline phase and provide an insufficient change of reflectivity associated with a phase change. A too thick recording layer would provide a lower reflectivity and a lower degree of modulation.

The recording layer is preferably formed by sputtering. The conditions for the sputtering are not critical, and when a material containing two or more elements are sputtered, the sputtering may be effected by using an alloy target or by using multi-target sputtering employing two or more targets.

Reflective Layer 5

The reflective layer 5 may be formed from any desired material, and typically, the reflective layer 5 is formed from a metal of high reflectance such as Al, Au, Ag, Pt, Cu, Ni, Cr, or Ti as a simple substance or as an alloy containing at least one of such metals. The reflective layer is preferably about 30 to 300 nm thick. Reflectance will be insufficient with a thickness below this range. A thickness beyond this range will provide no substantial improvement in reflectance and add to the cost. The Reflective layer is preferably formed by vapor deposition such as sputtering and evaporation.

Protective Layer 6

The protective layer 6 is provided for improving scratch resistance and corrosion resistance. Preferably, the protective layer is formed of an organic material, typically a radiation curable compound or a composition thereof which is cured with radiation such as electron and UV radiation. The protective layer is generally about 0.1 to 100 $\mu$m thick and may be formed by conventional techniques such as spin coating, gravure coating, spray coating, and dipping.

Adhesive Layer

The adhesive used for the adhesive layer is not limited to any particular type, and the adhesive may be a hot melt adhesives, a UV curing adhesive, or a room temperature curing adhesive, or alternatively, a pressure sensitive adhesive.

Constitution of FIGS. 3 and 4 (absorption coefficient control structure)

Referring to FIGS. 3 and 4, there are illustrated further embodiments of the optical recording medium to which the present invention may be applied. The optical recording medium of such type is herein referred to as the medium of absorption coefficient control structure as described above. The absorption coefficient control structure has been selected for the reason as described below.

The optical recording medium of phase change type utilizes difference in reflectance between the crystalline and the noncrystalline state, and light absorption (Ac) of the recording layer in the region other than record marks (in crystalline state) and the light absorption (Aa) of the recording layer in the record marks (in noncrystalline state) are often different, and the Ac<Aa is the condition generally found in such situation. It should be noted that Ac and Aa are values measured at the wavelength of the recording/reproducing laser beam. Recording sensitivity and erasability are thus different depending on whether the region overwritten is crystalline or noncrystalline, and consequently, the record marks of different length and width are formed by the overwriting to invite increase in the jitter often resulting in errors. When mark edge recording wherein the information is encoded in opposite edges of the record marks is adopted for increasing the recording density, variation in the length of the record marks has greater significance and such variation invites increased errors.

In order to solve such a situation, it is preferable that Ac is close to Aa. More illustratively, Ac and Aa are preferably such that Ac/Aa$\geq$0.9, more preferably Ac/Aa$\geq$1, and most preferably Ac/Aa>1 in consideration of the latent heat, by regulating the thickness of the recording layer or the dielectric layers sandwiching the recording layer. In the medium of conventional structure, increase of Ac/Aa results in reduced difference between the reflectance (Rc) of the medium of the region other than the record marks and the reflectance (Ra) of the medium in the record marks, and hence, in a reduced C/N.

In view of such situation, JP-A 124218/1996 proposes an optical information recording medium comprising a substrate, a first dielectric layer, a recording layer, a second dielectric layer, a reflective layer, a third dielectric layer, and a UV cured resin layer disposed in this order wherein Ac>Aa, and an extremely thin metal film of high light transmission, Si or Ge is used for the reflective layer, and a dielectric material having a refractive index of higher than 1.5 is used for the third dielectric layer. The relation Ac>Aa is achieved without detracting from the high (Rc-Ra) by providing the reflective layer of high light transmission and the third dielectric layer of high refractive index.

At should be noted that Ac and Aa can be calculated from optical constant of each layer and the wavelength of the recording/reproducing laser beam.

The optical recording media shown in FIGS. 3 and 4 are respectively a single side recording medium wherein the reflective layer 5 is of the constitution as in the case of JP-A 124218/96, and wherein a third dielectric layer 33 is disposed between the reflective layer 5 and the protective layer 6. As in the case of the single side recording medium of FIG. 1, the optical recording medium of FIG. 3 or 4 may be adhered with another such medium to form a dual side recording medium, or alternatively, the medium may be adhered to a protective substrate.

In FIGS. 3 and 4, the reflective layer 5 may comprise an extremely thin layer of a metal of high light transmission or a layer of silicon or germanium having a high transmission for the light of near infrared to infrared region including the recording/reproducing wavelength. The thickness of the reflective layer may be adequately determined to enable the control of the absorption coefficient between the region other than the record marks and the record marks as described above. The range of the preferable thickness of the reflective layer is significantly different by the material constituting the reflective layer, and the thickness may be determined in accordance with the material. When a metal such as Au is used for the reflective layer, the reflective layer may preferably have a thickness of up to 40 nm, and more preferably 10 to 30 nm. When Si or Ge is used for the reflective layer, the reflective layer may preferably have a thickness of up to 80 nm, and more preferably from 30 to 70 nm. A thickness below this range will invite decline of C/N, and a thickness beyond this range would provide no substantial improvement in the absorption coefficient control effect.

When the reflective layer 5 is formed from a metal, the reflective layer may preferably comprise Au or an alloy thereof. The Au alloy may comprise the main component of Au and at least one alloying component selected from Al, Cr, Cu, Ge, Co, Ni, Mo, Ag, Pt, Pd, Ta, Ti, Bi and Sb.

The reflective layer 5 is preferably formed by vapor deposition such as sputtering and evaporation.

The third dielectric layer 33 optionally formed on the reflective layer 5 is preferably formed from a material which has a refractive index higher than the protective layer 6. By providing such third dielectric layer 33, the Ac/Aa as described above can be increased while maintaining the difference in reflectivity between the record marks and the region other than the record marks at a sufficient level as in the case of JP-A 124218/1996, supra.

The third dielectric layer 33 is preferably formed from a material adequately selected from the dielectric materials described in the explanation of the first and second dielectric layers. Although the materials used are not particularly limited, the third dielectric layer 33 may preferably contain zinc sulfide and silicon oxide as its main components.

The third dielectric layer may preferably have a thickness of 30 to 120 nm, and more preferably 40 to 90 nm. An excessively thin third dielectric layer results in the decline of the signal output, and an excessively thick third dielectric layer results in the erasure of the signals in the adjacent track (cross erase).

In the structure as described above wherein Ac and Aa are controlled, the recording/reproducing laser beam is generally directed from the rear side of the transparent substrate and the beam penetrates and goes out from the side of the reflective layer. The light transmittance in such instance is generally at least about 1%, and most preferably at least about 3%. It should be noted that the light transmittance is the value measured when the medium solely comprises the transparent substrate and the inorganic layers, and in the case of the construction of FIG. 3 or 4, the value measured for the medium with no protection layer 6. Therefore, the light transmittance is the value as a result of multiple reflection between the inorganic layers, that is, the recording layer, the dielectric layers, the reflective layer, and the like. The light transmittance can be measured with a spectrophotometer. The region measured is not particularly limited, and the light transmittance may be measured either for a crystalline region or for a noncrystalline region. The light transmittance, however, is generally measured for the crystalline region where no grooves are defined (mirror region).

In the optical recording medium shown in FIG. 3 or 4, the substrate 2, the recording layer 4, and the protective layer 6 may be of the constitution similar to those of the optical recording medium shown in FIG. 1 or 2 except that the preferable thickness of the recording layer 4 is in the range of 10 to 50 nm.

The constitution of the first dielectric layer 31 and the second dielectric layer 32 in the medium of absorption coefficient control structure is not particularly limited. However, the first dielectric layers may preferably have the constitution as described below for the purpose of increasing the number of overwritable operations.

The first dielectric layer 31 is preferably of the constitution the same as the one described for the first dielectric layer in the medium of reflective structure.

The second dielectric layer 32 may be either of single layer structure (see FIG. 3) or of laminate structure (see FIG. 4). In either case, the region of the second dielectric layer 32 in contact with the recording layer 4, namely, the entire second dielectric layer 32 in the case of FIG. 3 and the dielectric layer 2a in the case of FIG. 4 may preferably contain germanium nitride and/or silicon nitride; oxide of a rare earth metal; silicon oxide; or zinc sulfide and silicon oxide as its main component(s); and more preferably, germanium nitride and/or silicon nitride; or zinc sulfide and silicon oxide as its main component(s); and most preferably, germanium nitride or silicon nitride as its main component. When such region contains zinc sulfide and silicon oxide as its main components, the silicon oxide content is preferably at least 40 mol %, more preferably 40 to 80 mol %, and most preferably 40 to 60 mol %. When the silicon oxide content is too low, influence of the zinc and sulfur diffusion from the second dielectric layer 32 to the recording layer 4 will be significant, and when the silicon oxide content is too high, exfoliation is likely to take place in the second dielectric layer during the initialization and overwriting operations.

The rare earth metal element which may be employed in the second dielectric layer 32 is not limited to any particular type, and at least one rare earth metal element selected from Ce, La, Y, Pr, Nd, Pm, Sm, Eu, Gd, Tb, Dy, Ho, Er, Tm, Yb, Lu and the like may be employed. The rare earth metal element is preferably at least one of Ce, La and Y.

In the optical recording medium of FIG. 4, the composition of the dielectric layer 2b formed on the dielectric layer 2a is not particularly limited. The dielectric layer 2b, however, may generally contain zinc sulfide and silicon oxide as its main components. In such a case, the silicon oxide content is preferably in the range of 2 to less than 40 mol % (excluding 40 mol %) although the content may not necessarily be within such range.

The second dielectric layer 32 may preferably have a thickness of 10 to 50 nm, and more preferably, 13 to 35 nm. When the second dielectric layer has a thickness within such range, cooling speed is increased and the edge of the record marks will be clear to result in reduced jitter. The thickness within such range also enables increase in the degree of modulation. It should be noted that the region of the second dielectric layer in contact with the recording layer (for example, the dielectric layer 2a in the case of FIG. 4) may preferably have a thickness of at least 1 nm, and more preferably, a thickness of at least 5 nm. The region with an insufficient thickness will not play satisfactory role as a barrier layer.

Recording and Reproduction

The optical recording medium of the present invention may be overwritten as in the case of the conventional optical recording medium of phase change type. However, it is preferable to use a laser beam of the modulation pattern as described below.

Figure 5A:
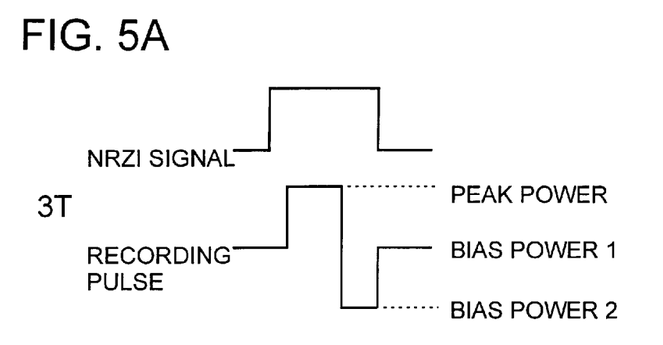
FIGS. 5(a) and 5(b) are graphs showing the modulation pattern of the laser beam used for overwriting the optical recording medium (of reflective type) according to the present invention.
Figure 5B:
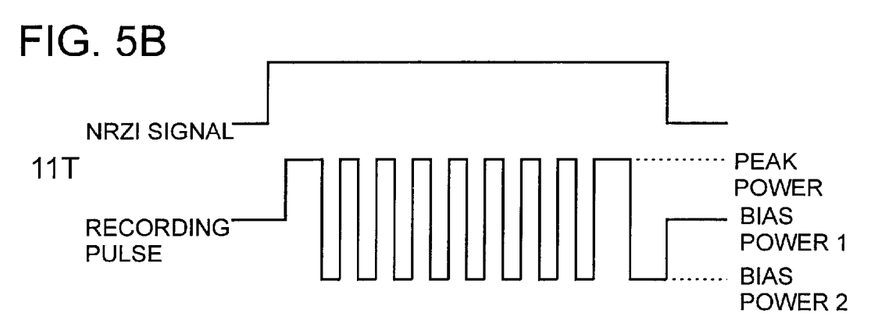

The modulation patterns of the laser beam preferable for use in the present invention are shown in FIGS. 5(a) and 5(b). FIG. 5(a) shows the modulation pattern (pattern of the recording pulse) for recording with 3T signal, and FIG. 5(b) shows the modulation pattern for recording with 11T signal. In FIGS. 5(a) and 5(b), time is shown in horizontal direction, and power level of the laser beam is shown in vertical direction. It should be noted that the patterns of NRZI signal for 3T and 11T are also shown in FIGS. 5(a) and 5(b).

These modulation patterns utilize three power levels, namely, $P_P$ (peak power); $P_{B1}$ (bias power 1) lower than the $P_P$; and $P_{B2}$ (bias power 2) lower than the $P_{B1}$. Pulse modulation of the recording power is not novel in the art. However, in the conventional pulse modulation, the bottom value of the recording pulse was the erasing power $P_{B1}$. In contrast, the patterns of the present invention has the characteristic feature that the recording pulse is modulated between the peak value $P_P$ and the bottom value $P_{B2}$, and after the irradiation of the last pulse, the power level is reduced to the bottom value $P_{B2}$ and then increased to the erasing power level $P_{B1}$. By using the recording pulse of such pattern, deformation of record marks is prevented and increase of jitter can be suppressed even when the recording is conducted at a high density.

$P_P$, $P_{B1}$, and $P_{B2}$ vary with the conditions such as composition of the recording layer and linear velocity of the recording medium. However, $P_P$, $P_{B1}$, and $P_{B2}$ are generally selected from the ranges of 9 to 12 mW, 4 to 6 mw, and 0 to 2 mW, respectively. It should be noted that the recording power and the erasing power in the medium of absorption coefficient control structure is also generally selected from the ranges of 9 to 12 mW and 4 to 6 mW.

In the overwriting of the optical recording medium of the invention, the linear velocity of the recording layer in relation to the laser beam is not limited to particular range. The linear velocity, however, is generally about 0.8 to 20 m/s, and preferably 1.2 to 16 m/s when the recording layer is of the composition as described above.

In the optical recording medium having the recording layer of the composition as described above, the light used for the overwriting and reproduction may be selected from a wide range of wavelength, for example, from the range of 100 to 5,000 nm.

EXAMPLES

Examples of the present invention are given below by way of illustration and not by way of limitation.

Example 1 (Reflective structure)

A disc shaped substrate 2 having a diameter of 120 mm and a thickness of 0.6 mm was prepared by injection molding polycarbonate. A groove was formed in one major surface of the substrate simultaneous with the injection molding. The groove had a width of 0.74 μm, a depth of 65 nm, and a pitch of 1.48 μm. On the grooved surface of the substrate, there were formed a first dielectric layer 31, a recording layer 4, a second dielectric layer 32, a reflective layer 5, and a protective layer 6 by the procedure as described below to produce the optical recording disc samples of the constitution as depicted in FIGS. 1 and 2.

The composition and the thickness of the dielectric layers constituting the first dielectric layer 31 are shown in Table 1. The composition and the thickness of the first dielectric layer of single layer constitution are shown in the column of the dielectric layer 1a in Table 1. Of the dielectric layers, those comprising $ZnS$—$SiO_2$ were formed by sputtering in argon atmosphere, and those comprising $Si_3N_4$ or $Ge_3N_4$ were formed by reactive sputtering in a nitrogen-containing argon atmosphere by using a target comprising Si or Ge.

The recording layer 4 was formed by sputtering in argon atmosphere using $Ge_2Sb_2Te_5$ (atomic ratio) and Ag or Au for the target. The recording layer containing no Ag or Au were also formed for comparison purpose. Content of the Au or the Ag and the thickness of the recording layer are also shown in Table 1.

The composition and the thickness of the dielectric layers constituting the second dielectric layer 32 are also shown in Table 1. The composition and the thickness of the second dielectric layer of single layer constitution are shown in the column of the dielectric layer 2a in Table 1. The dielectric layer shown in the column of the dielectric layer 2a in Table 1 were formed by sputtering in $Ar+N_2$ atmosphere using $ZnS$—$SiO_2$ for the target. Flow rate ratio $[N_2/(Ar+N_2)]$ was 18%. The sputtering atmosphere was pure argon when no Ag or Au was added to the recording layer. The dielectric layer 2b was formed by sputtering in argon atmosphere.

The reflective layer 5 was formed by sputtering in argon atmosphere by using Al–1.7 at % Cr for the target. The reflective layer 5 was formed to a thickness of 150 nm.

The protective layer 6 was formed by applying a UV curable resin by spin coating and exposing it to UV for curing. The protective layer as cured had a thickness of 5 μm.

The thus produced samples were initialized by a bulk eraser. The crystal grain size of the recording layer after the initialization was about 100 nm. The initialized samples were then evaluated for their properties in the repeated overwriting operations on an optical recording medium evaluator at a wavelength of 638 nm, NA (numerical aperture) of 0.6, and a linear velocity of 6 m/s by using the recording pulse as described below.

Recording Pulse

Pulse pattern: The exemplary patterns shown in FIGS. 5(a) and 5(b).

Recording power (peak power): 11.0 mW

Erasing power (bias power 1): 5.0 mW

Bottom power (bias power 2): 0.5 mW

The overwriting was conducted by two procedures as described below. The first procedure is the one generally conducted with an optical recording medium evaluator, and in this procedure, timing control for complete overlaying of the record mark on the previous record mark was not conducted. The second procedure is the one more close to the actual overwriting pattern in the optical disc drive and this procedure enables a more strict evaluation. In this procedure, the same signal patterns are overwritten with the timing control so that the record marks are completely overlaid on the previous record marks.

The numbers of overwritable operations in the evaluation by the first and the second procedures are shown in Table 1. It should be noted that the number of overwritable operations was evaluated by determining maximum number of overwritable operations wherein jitter remained in the range of up to 13%.

TABLE 1

| Sample No. | Dielectric layer 1a | | Dielectric layer 1b | | Recording layer | | Dielectric layer 2a | | Dielectric layer 2b | | Number of overwritable operations | |
|---|---|---|---|---|---|---|---|---|---|---|---|---|
| | ZnS:SiO$_2$ (mol %) | Thickness (nm) | Composition (mol %) | Thickness (nm) | Element added (at %) | Thickness (nm) | Composition (mol %) | Thickness (nm) | Composition (mol %) | Thickness (nm) | First procedure | Second procedure |
| 1 | 85:15 | 85 | ZnS:SiO$_2$ (50:50) | 20 | Ag(0.4) | 20 | ZnS:SiO$_2$ (50:50) | 30 | — | — | >100,000 | ~120 |
| 2 | 85:15 | 85 | ZnS:SiO$_2$ (50:50) | 20 | Ag(0.8) | 20 | ZnS:SiO$_2$ (50:50) | 30 | — | — | >100,000 | ~150 |
| 3 | 85:15 | 85 | ZnS:SiO$_2$ (50:50) | 20 | Ag(1.1) | 20 | ZnS:SiO$_2$ (50:50) | 30 | — | — | >100,000 | ~180 |
| 4 | 85:15 | 95 | Si$_3$N$_4$(100) | 1 | Ag(0.3) | 22 | ZnS:SiO$_2$ (50:50) | 30 | — | — | >100,000 | ~120 |

TABLE 1-continued

| Sample No. | Dielectric layer 1a ZnS:SiO$_2$ (mol %) | Thickness (nm) | Dielectric layer 1b Composition (mol %) | Thickness (nm) | Recording layer Element added (at %) | Thickness (nm) | Dielectric layer 2a Composition (mol %) | Thickness (nm) | Dielectric layer 2b Composition (mol %) | Thickness (nm) | Number of overwritable operations First procedure | Second procedure |
|---|---|---|---|---|---|---|---|---|---|---|---|---|
| 5 | 85:15 | 95 | Si$_3$N$_4$(100) | 1 | Ag(0.7) | 22 | ZnS:SiO$_2$ (50:50) | 30 | — | — | >100,000 | ~150 |
| 6 | 85:15 | 95 | Si$_3$N$_4$(100) | 1 | Ag(1.1) | 22 | ZnS:SiO$_2$ (50:50) | 30 | — | — | >100,000 | ~180 |
| 7 | 85:15 | 95 | Ge$_3$N$_4$(100) | 10 | Ag(1.1) | 22 | ZnS:SiO$_2$ (50:50) | 30 | — | — | >100,000 | ~250 |
| 8 | 85:15 | 85 | Ge$_3$N$_4$(100) | 20 | Ag(1.1) | 22 | ZnS:SiO$_2$ (50:50) | 30 | — | — | >100,000 | ~1,000 |
| 9 | 85:15 | 75 | Ge$_3$N$_4$(100) | 30 | Ag(1.1) | 22 | ZnS:SiO$_2$ (50:50) | 30 | — | — | >100,000 | ~1,400 |
| 10 | 85:15 | 85 | Ge$_3$N$_4$(100) | 20 | Ag(1.1) | 20 | ZnS:SiO$_2$ (85:15) | 5 | SiO$_2$(100) | 20 | >100,000 | ~1,000 |
| 11 | 85:15 | 85 | Ge$_3$N$_4$(100) | 20 | Ag(1.1) | 20 | ZnS:SiO$_2$ (85:15) | 5 | CeO$_2$(100) | 20 | >100,000 | ~1,100 |
| 12 | 85:15 | 85 | Ge$_3$N$_4$(100) | 20 | Ag(1.1) | 20 | ZnS:SiO$_2$ (50:50) | 5 | SiO$_2$(100) | 25 | >100,000 | ~1,200 |
| 13 | 85:15 | 85 | Ge$_3$N$_4$(100) | 20 | Ag(1.1) | 20 | ZnS:SiO$_2$ (50:50) | 5 | CeO$_2$(100) | 25 | >100,000 | ~1,200 |
| 14 | 85:15 | 95 | Ge$_3$N$_4$(100) | 10 | Au(0.4) | 22 | ZnS:SiO$_2$ (50:50) | 30 | — | — | >100,000 | ~250 |
| 15 | 85:15 | 85 | Ge$_3$N$_4$(100) | 20 | Au(0.4) | 22 | ZnS:SiO$_2$ (50:50) | 30 | — | — | >100,000 | ~1,000 |
| 16 | 85:15 | 75 | Ge$_3$N$_4$(100) | 30 | Au(0.4) | 22 | ZnS:SiO$_2$ (50:50) | 30 | — | — | >100,000 | ~1,400 |
| 17** | 85:15 | 105 | — | — | — | 20 | ZnS:SiO$_2$ (50:50) | 30 | — | — | ~1,000 | — |
| 18** | 85:15 | 95 | Si$_3$N$_4$(100) | 1 | — | 20 | ZnS:SiO$_2$ (50:50) | 30 | — | — | >100,000 | ~60 |
| 19** | 85:15 | 95 | Si$_3$N$_4$(100) | 1 | Ag(3.0*) | 20 | ZnS:SiO$_2$ (50:50) | 30 | — | — | — | — |

*outside the claimed scope
**Comparison

The merit of the present invention is evident from the results shown in Table 1. The number of overwritable operations was at a sufficient level in all of the samples of the present invention wherein Ag or Au of a predetermined amount had been added. In contrast, the number of overwritable operations was as low as about 1000 times even in the evaluation by the first procedure in the Comparative Sample No. 17 wherein no Ag or Au has been added to the recording layer and the dielectric layer is not of the preferable constitution of the present invention. In the Comparative Sample No. 18 wherein the dielectric layer is of the preferable constitution of the present invention but no Ag or Au has been added to the recording layer, the number of overwritable operations was more than 100,000 times in the evaluation by the first procedure but the number of overwritable operations was as low as about 60 times when evaluated by the second procedure. It should be noted that the Comparative Sample No. 19 wherein the recording layer had an excessively high Ag content was unerasable.

Example 2 (Reflective structure)

Optical recording disc samples were prepared as in the case of samples of Example 1 except that the layers were constituted as shown in Table 2. The dielectric layer comprising Cr$_2$O$_3$ was formed by sputtering in Ar atmosphere using Cr$_2$O$_3$ for the target. The second dielectric layer 32 of Sample No. 20 was formed by sputtering in Ar+N$_2$ atmosphere using ZnS—SiO$_2$ for the target. Flow rate ratio [N$_2$/(Ar+N$_2$)] was 18%.

The dielectric layer comprising Si$_3$N$_4$ had a thermal conductivity of 10 W/mK, and the dielectric layer comprising ZnS (85 mol %)-SiO$_2$ (15 mol %) had a thermal conductivity of 0.6 W/mK. This thermal conductivity is the value measured for a dielectiric film of 1 μm thick on a substrate which had been formed under the conditions the same as the formation of the dielectric layers by using a Quick Thermal Conductivity Meter (Kemtherm QTM-500). The method adopted in this Quick Thermal Conductivity Meter is the so-called "QTM method" wherein a probe comprising a substrate of known thermal conductivity and a heating wire and a thermocouple disposed on a surface of the substrate is employed, and the thermal conductivity is measured by bringing the object to be measured in close contact with said probe surface. In the measurement, the thermal conductivity of the dielectric film was determined from the measurements of the substrate having deposited thereon a dielectric film of 1 μm thick and a substrate having no such film.

The thus produced samples were initialized as in the case of Example 1, and evaluated for their performance. The results are shown in Table 2.

TABLE 2

| Sample No. | Dielectric layer 1a ZnS:SiO$_2$ (mol %) | Dielectric layer 1a Thickness (nm) | Dielectric layer 1b Composition (mol %) | Dielectric layer 1b Thickness (nm) | Recording layer Element added (at %) | Recording layer Thickness (nm) | Dielectric layer 2a Composition (mol %) | Dielectric layer 2a Thickness (nm) | Dielectric layer 2b Composition (mol %) | Dielectric layer 2b Thickness (nm) | Number of overwritable operations First procedure | Number of overwritable operations Second procedure |
|---|---|---|---|---|---|---|---|---|---|---|---|---|
| 1 | 85:15 | 94 | Cr$_2$O$_3$ (100) | 2 | Ag(0.7) | 22 | ZnS:SiO$_2$ (50:50) | 30 | — | — | >100,000 | ~140 |
| 2 | 85:15 | 85 | Ge$_3$N$_4$ (100) | 20 | Ag(1.5) | 22 | Ge$_3$N$_4$(100) | 40 | — | — | >100,000 | ~1,200 |
| 3 | 85:15 | 85 | Ge$_3$N$_4$ (100) | 20 | Ag(1.5) | 22 | Ge$_3$N$_4$(100) | 10 | ZnS:SiO$_2$(85:15) | 15 | >100,000 | ~1,100 |
| 4 | 85:15 | 94 | Cr$_2$O$_3$ (100) | 2 | Ag(1.3) | 22 | Cr$_2$O$_3$(100) | 5 | ZnS:SiO$_2$(85:15) | 20 | >100,000 | ~150 |
| 5 | 85:15 | 95 | Si$_3$N$_4$ (100) | 1 | Ag(1.2) | 22 | Si$_3$N$_4$(100) | 10 | ZnS:SiO$_2$(85:15) | 15 | >100,000 | ~160 |

The results demonstrated that the samples of Table 2 exhibit excellent performance as in the cases of the samples of Table 1.

Example 3 (Absorption coefficient control structures)

A disc shaped substrate 2 having a diameter of 120 mm and a thickness of 0.6 mm was prepared by injection molding polycarbonate. A groove was formed in one major surface of the substrate simultaneous with the injection molding. The groove had a width of 0.60 μm, a depth of 50 nm, and a pitch of 1.20 μm. On the grooved surface of the substrate, there were formed a first dielectric layer 31, a recording layer 4, a second dielectric layer 32, a reflective layer 5, a third dielectric layer 33, and a protective layer 6 by the procedure as described below to produce the optical recording disc samples of the constitution as depicted in FIG. 3.

The composition and the thickness of the dielectric layers constituting the first dielectric layer 31 and the second dielectric layer 32 are shown in Table 3. The composition and the thickness of the first dielectric layer of single layer constitution are shown in the column of the dielectric layer 1a in Table 3, and the composition and the thickness of the second dielectric layer of single layer constitution are shown in the column of the dielectric layer 2a in Table 3. The dielectric layers were formed in accordance with the procedure described in Example 1.

The recording layer 4 was formed by sputtering in argon atmosphere using Ge$_2$Sb$_2$Te$_5$ (atomic ratio) and Ag for the target. The Ag content and the thickness of the recording layer are also shown in Table 3. The recording layer containing no Ag was also sputtered in argon atmosphere The reflective layer 5 was formed by sputtering in argon atmosphere by using Si for the target. The reflective layer 5 was formed to a thickness of 50 nm.

The third dielectric layer 33 was formed by sputtering in argon atmosphere using ZnS (85 mol %)-SiO$_2$ (15 mol %) for the target. The third dielectric layer was formed to a thickness of 60 nm.

The protective layer 6 was formed in accordance with the procedure described in Example 1.

The thus produced samples were initialized by a bulk eraser. The crystal grain size of the recording layer after the initialization was about 100 nm. After the initialization, the medium from which the protective layer 6 had been removed was irradiated from the side of the substrate 2 with a laser beam at a wavelength of 680 nm to measure the light transmittance of the mirror region (crystalline region) with a spectrophotometer. The light transmittance was measured to be 5% or higher. The samples had Ac/Aa at the wavelength of 680 nm of 0.9 or higher. The samples were then evaluated for their properties in the repeated overwriting operations with (1–7) RLL recording signals in an optical recording medium evaluator at a wavelength of 680 nm and NA (numerical aperture) of 0.6. The linear velocity was 12 m/s in Sample No. 25, and 14 m/s in Sample No. 26 of Table 3. In the overwriting, timing control for complete overlaying of the record marks was not conducted as in the case of the first procedure employed in Example 1. The numbers of overwritable operations in this Example are shown in Table 3. It should be noted that the number of overwritable operations in this Example was evaluated by determining maximum number of overwritable operations wherein byte error rate (BER) is up to $5.0 \times 10^{-7}$.

TABLE 3

| Sample No. | Dielectric layer 1a ZnS:SiO$_2$ (mol %) | Dielectric layer 1a Thickness (nm) | Dielectric layer 1b Composition (mol %) | Dielectric layer 1b Thickness (nm) | Recording layer Element added (at %) | Recording layer Thickness (nm) | Dielectric layer 2a Composition (mol %) | Dielectric layer 2a Thickness (nm) | Dielectric layer 2b ZnS:SiO$_2$ (mol %) | Dielectric layer 2b Thickness (nm) | Number of overwritable operation |
|---|---|---|---|---|---|---|---|---|---|---|---|
| 25 | 85:15 | 190 | Ge$_3$N$_4$(100) | 10 | Ag(1.1) | 14 | Si$_3$N$_4$(100) | 15 | — | — | ~100,000 |
| 26 comp. | 85:15 | 190 | Ge$_3$N$_4$(100) | 10 | — | 14 | Si$_3$N$_4$(100) | 15 | — | — | ~50,000 |

The results shown in Table 3 demonstrate that the merits of the present invention are also realized in the optical medium of absorption coefficient control structure.

Japanese Patent Application Nos. 365706/1997 and 341132/1998 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium having a substrate and a recording layer of phase change type, wherein the recording layer contains Ge, Sb and Te as its main elements, and at least one of Ag and Au in total content of 0.2 to less than 2.5 at % (excluding 2.5 at %).

2. An optical recording medium according to claim 1 wherein the recording layer has a first dielectric layer and a second dielectric layer disposed on lower and upper sides thereof and in contact therewith, respectively, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components and the dielectric layer 1b contains silicon nitride and/or germanium nitride; silicon oxide; zinc sulfide and silicon oxide; or chromium oxide as its main component (s); and when the dielectric layer 1b contains zinc sulfide and silicon oxide as its main components, the dielectric layer 1b has silicon oxide content [$SiO_2/(ZnS+SiO_2)$] of at least 40 mol %, the silicon oxide content being determined by calculating the zinc sulfide and the silicon oxide in terms of ZnS and $SiO_2$, respectively; and the second dielectric layer contains zinc sulfide and silicon oxide; silicon oxide; oxide of a rare earth metal; or germanium nitride as its main component(s).

3. An optical recording medium according to claim 1 wherein the recording layer has a first dielectric layer and a second dielectric layer disposed on lower and upper sides thereof and in contact therewith, respectively, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components, and the dielectric layer 1b contains silicon nitride and/or germanium nitride; silicon oxide; zinc sulfide and silicon oxide; or chromium oxide as its main component(s); and when the dielectric layer 1b contains zinc sulfide and silicon oxide as its main components, the dielectric layer 1b has silicon oxide content [$SiO_2/(ZnS+SiO_2)$] of at least 40 mol %, the silicon oxide content being determined by calculating the zinc sulfide and the silicon oxide in terms of ZnS and $SiO_2$, respectively; and the second dielectric layer comprises a dielectric layer 2a on the side of the recording layer and a dielectric layer 2b on the side of the reflective layer, and the dielectric layer 2a contains zinc sulfide and silicon oxide as its main components, and the dielectric layer 2b contains silicon oxide or oxide of a rare earth metal as its main component, or the dielectric layer 2a contains silicon nitride and/or germanium nitride; or chromium oxide as its main component(s), and the dielectric layer 2b contains a dielectric material having a thermal conductivity lower than the dielectric layer 2a as its main component.

4. The optical recording medium according to claim 2 or 3 wherein the dielectric layer 1b has a thickness of 0.5 to 40 nm.

5. The optical recording medium according to claim 3 wherein the dielectric layer 1b contains silicon nitride as its main component, and the dielectric layer 1b has a thickness of 0.5 to less than 5 nm (excluding 5 nm).

6. The optical recording medium according to claim 2 or 3 wherein the dielectric layer 1a has silicon oxide content in the range of from 2 mol % to less than 40 mol % (excluding 40 mol %) when the silicon oxide content [$SiO_2/(ZnS+SiO_2)$] is determined by calculating the zinc sulfide and the silicon oxide in terms of ZnS and $SiO_2$, respectively.

7. The optical recording medium according to claim 1 wherein the recording layer has a first dielectric layer and a second dielectric layer disposed on lower and upper sides thereof and in contact therewith, respectively, wherein said recording layer has a light absorption coefficient at recording/reproducing wavelength such that:

$$Ac/Aa \geq 0.9$$

when the light absorption coefficient of the medium in crystalline region of the recording layer is Ac and the light absorption coefficient in noncrystalline region is Aa;

the first dielectric layer comprises a dielectric layer 1a on the side of the substrate and a dielectric layer 1b on the side of the recording layer, and the dielectric layer 1b contains silicon nitride and/or germanium nitride as its main component(s), and the dielectric layer 1a contains zinc sulfide and silicon oxide as its main components; and at least the region of the second dielectric layer in contact with the recording layer contains germanium nitride and/or silicon nitride; oxide of a rare earth metal; silicon oxide; or zinc sulfide and silicon oxide as its main component(s); and when such region contains zinc sulfide and silicon oxide as its main components, the region has silicon oxide content [$SiO_2/(ZnS+SiO_2)$] of at least 40 mol %, the silicon oxide content being determined by calculating the zinc sulfide and the silicon oxide in terms of ZnS and $SiO_2$, respectively.

8. The optical recording medium according to claim 7 wherein the dielectric layer 1b has a thickness of 0.5 to 40 nm.

9. The optical recording medium according to claim 7 wherein the dielectric layer 1b contains silicon nitride as its main component, and the dielectric layer 1b has a thickness of 0.5 to less than 5 nm (excluding 5 nm).

10. The optical recording medium according to claim 7 wherein the dielectric layer 1a has silicon oxide content in the range of from 2 mol % to less than 40 mol % (excluding 40 mol %) when the silicon oxide content [$SiO_2/(ZnS+$ $SiO_2$)] is determined by calculating the zinc sulfide and the silicon oxide in terms of ZnS and $SiO_2$, respectively.

11. The optical recording medium according to claim 7 wherein the recording medium has a reflective layer disposed on the second dielectric layer, and the reflective layer is the one comprising a metal and having a thickness of up to 40 nm, or the one comprising Si or Ge and having a thickness of up to 80 nm.

12. The optical recording medium according to claim 11 wherein the recording medium has a third dielectric layer on the reflective layer.

13. The optical recording medium according to anyone of claims 1, 2, 3 or 7 wherein the recording layer has an average crystal grain size of 20 to 150 nm.

* * * * *